July 1, 1969 R. W. LESTER 3,453,599

PLURAL FREQUENCY ELECTRONIC CONTROL SYSTEM WITH FLIP-FLOP CONTROL OF PULSE TRANSFER BY A UNIJUNCTION TRANSISTOR TO A PULSE RESPONSIVE SWITCH

Filed July 22, 1966

INVENTOR.
ROBERT W. LESTER

BY [signature]

ATTORNEY

United States Patent Office 3,453,599
Patented July 1, 1969

3,453,599

PLURAL FREQUENCY ELECTRONIC CONTROL SYSTEM WITH FLIP-FLOP CONTROL OF PULSE TRANSFER BY A UNIJUNCTION TRANSISTOR TO A PULSE RESPONSIVE SWITCH

Robert W. Lester, Manhasset, N.Y., assignor to Lester Controls Corporation, Jamaica, N.Y., a corporation of New York Filed July 22, 1966, Ser. No. 567,096
Int. Cl. H04q 1/45
U.S. Cl. 340—171 1 Claim

ABSTRACT OF THE DISCLOSURE

An electronic control system for the transmission of control pulses over a conventional power line including a frequency transmitter connected to the power line for feeding selected frequencies to said power line, a receiver connected to the power line and having a flip-flop circuit energized by a unidirectional pulsed generator, frequency responsive means connecting said flip-flop to the power line, a pulse generator connected with and actuated by said flip-flop and a semi-conductor switch operated by said generator.

This invention relates to electronic control systems and, more specifically to novel and improved remote control apparatus useful, among other things, for the transmission of control signals over a conventional power line for the control of remotely located electrical apparatus.

Numerous control systems have heretofore been suggested for remotely controlling electrical apparatus by the transmission of control signals over conventional power lines, but these prior systems have not been found entirely satisfactory. In remote control systems, whether utilizing existing power lines for the transmission of the control signals or other means, it is desirable that the device afford stable and dependable operation and at the same time avoid complicated circuitry utilized in prior known devices. The apparatus in accordance with the invention affords an improved arrangement of elements which not only provides stable and dependable operation, but one that is easily adjusted, will maintain the adjustment for extended periods of time and can be manufactured at relatively low cost.

Another object of the invention resides in the provision of a novel and improved remote control system which not only affords means for controlling electrical apparatus at a remote location, but also may be adjusted to deliver a selected amount of power to the load.

Another object of the invention resides in the provision of a novel and improved control system embodying individual transmitting and receiving means wherein the receiver is responsive to two selected signals for energizing and de-energizing a load controlled by the receiver. With this arrangement, a single transmitter operable to transmit sets of signals of different frequencies can be utilized to selectively operate two or more remotely located receivers.

A still further object of the invention resides in the provision of a novel and improved transmitting and receiving apparatus for remotely controlling a load wherein an electronic switching means is utilized in coordination with the receiving apparatus so that the power delivery to the load when in the energized condition can be controlled over a relatively wide range.

The above and other objects of the invention will become more apparent from the following description and accompanying drawings forming part of this application.

Figures 1, 2:
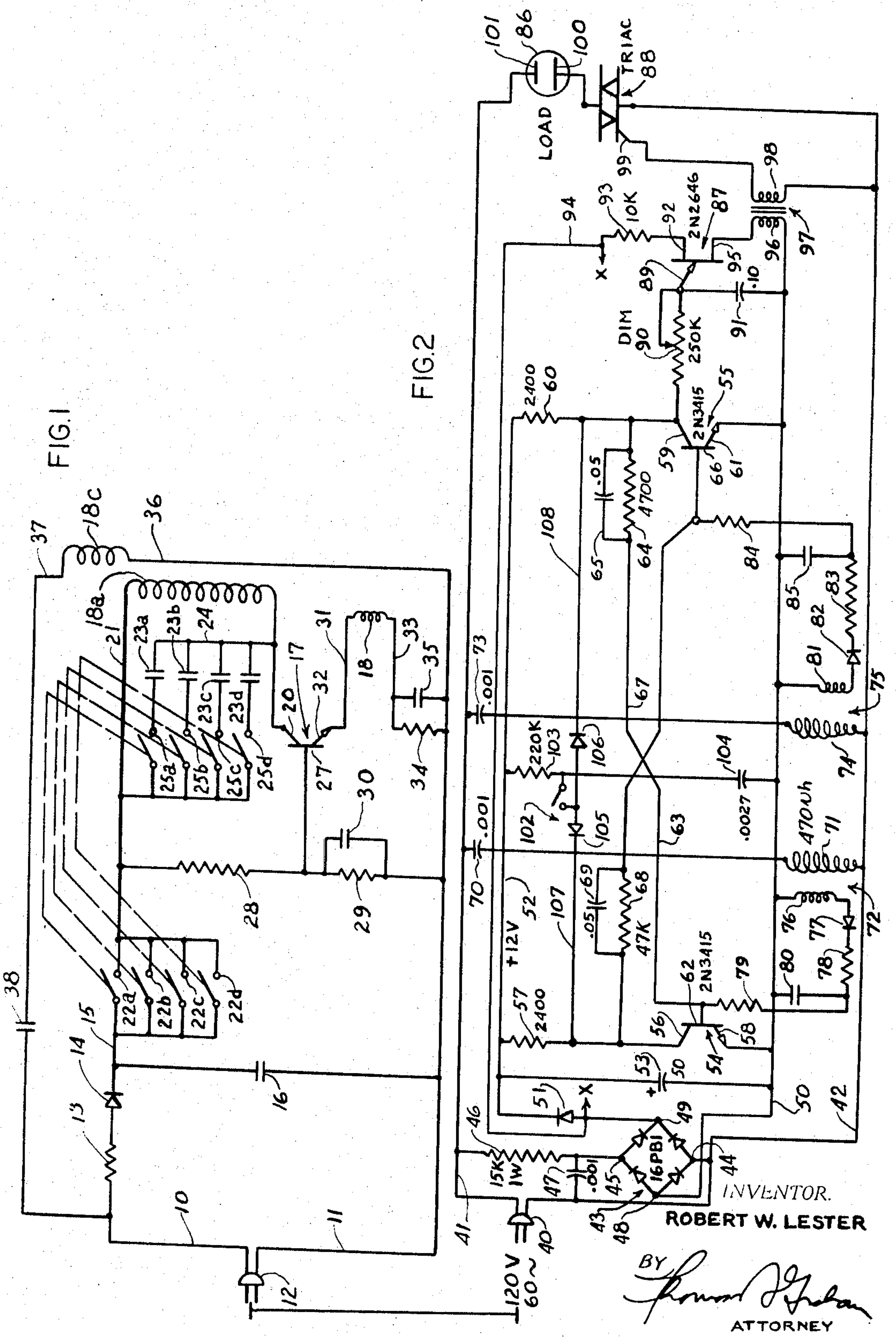
FIGURE 1 is a circuit diagram of one embodiment of a transmitter in accordance with the invention.
FIGURE 2 is a circuit diagram of one embodiment of a receiver and energy control system in accordance with the invention.

Broadly, the apparatus in accordance with the invention now to be described includes a transmitter embodying a collector-tuned oscillator powered from an AC line and including means feeding the generated frequency into the alternating current line from which power is derived for its operation. The oscillator is arranged to produce at least two different radio frequency signals for selectively energizing and de-energizing an electrical device controlled by the receiving apparatus. Furthermore, the oscillator may be arranged to generate sets of radio frequency signals for selectively controlling a plurality of individual receivers.

The receiving apparatus is powered by the same alternating current supply and includes a pair of transistors connected as a bi-stable multi-vibrator or flip-flop. In this type of circuit, one or the other of the transistors is always in a conducting state and the application of an energy pulse to the conconducting transistor will automatically place it in a conducting state and at the same time cause the other transistor to become non-conducting. An electronic switch for controlling the power to the load is connected to one of the transistors so that when it becomes non-conducting it will operate the switch to energize the load. The receiver further includes an improved arrangement for controlling the electronic switch so that the power delivered to the load can be adjusted over a relatively wide range. This feature is particularly useful when the device is utilized as an automatic night-light control since the receiver can be arranged to deliver a materially reduced voltage to the load and the transmitter can be automatically operated from a photocell control which senses ambient light.

Referring now to FIGURE 1 which is a circuit diagram of the transmitter, energy is fed to the transmitter via conductors 10 and 11 connected to a conventional wall plug 12 adapted to engage an alternating current outlet. The alternating current is reduced in magnitude by a series resistor 13 and is then rectified by a diode 14. The rectified voltage appearing between the leads 15 and 11 is filtered by a condenser 16 connected between these leads. In the instant embodiment of the invention, the DC voltage appearing between the leads 15 and 11 is approximately twenty volts with the polarity of the lead 15 being positive.

The oscillator is of the so-called plate-tuned type which in the case of transistors would be more appropriately termed collector-tuned. More specifically, the oscillator includes a transistor generally denoted by the numeral 17 and a coil having windings 18*a* and 18*c* which are inductively coupled one with the others. One side 19 of the winding 18*a* is connected to the collector 20 of transistor 17, while the other side 21 of the winding 18*a* is connected through the lead 21 to one pole of single pole, single throw switches 22*a*, 22*b*, 22*c* and 22*d* which are effectively connected in parallel. The other poles of the switches are connected together and to the lead 15.

The winding 18*a* is tuned to a selected frequency by connecting an appropriate capacitor across the winding. In the instant embodiment of the invention, the transmitter is arranged to oscillate at any one of four selected frequencies with two of the frequencies being used to operate a first remote receiver while the other two frequencies being used to operate a second remote receiver. It will be understood, however, that the transmitter may be provided with one or more sets of frequencies, and the selection of a particular frequency to be transmitted can be accomplished in any number of ways. In the instant illustration, four capacitors 23*a* and 23*b*, 23*c* and 23*d* are utilized. One side of each of the condensers is connected via the lead 24 to the side 19 of the winding 18*a*. The other side of each condenser is connected through switches 25*a*, 25*b*, 25*c* and 25*d* respectively to the lead 26 which is connected to the other side 21 of the winding 18*a*. For convenience in operation, the switches 22*a* and 25*a* are intended to be operated simultaneously, and similarly the switches 22*b* and 25*b*, 22*c* and 25*c*, and 22*d* and 25*d*. The switches 22*a* through 22*d* merely apply power to the oscillator, while the switches 25*a* through 25*d* select the particular frequency at which the oscillator will operate.

The base 27 of the transistor 17 is biased by resistors 28 and 29, the latter being bypassed by a condenser 30 which functions to stabilize the operation of the oscillator. The winding 18*b* which is inductively coupled with the winding 18*a* is the feedback winding, and it has one side 31 connected to the emitter 32 of the transistor 17, while the other side 33 is connected through a resistor 34 to the lead 11. The resistor 34 is bypassed by a condenser 35. The condenser 35 along with the condenser 30 minimize degeneration which would otherwise prevent oscillation of the circuit.

The oscillatory energy developed in the winding 18*a* is impressed upon the tertiary winding 18*c*, the latter being connected at one side 36 to the lead 11 and at the other side 37 through a condenser 38 to the lead 10. Thus, the energy induced into the winding 18*c* is automatically fed to the power line supplying energy to the transmitter. The condenser 38 is made large enough to pass the radio frequency energy developed by the oscillator and at the same time is of a small enough capacity so that negligible current from the AC line will flow through the winding 18*c*.

It is evident from the foregoing description of the transmitter that the switches 25*a* through *d* can be replaced by an appropriate selector switch in which case only one of the switches 22*a* through 22*d* would be required. In such a case, the operator would select a particular frequency to be transmitted and then close the switch 22*a* to apply power to the transmitter. It is also evident that a photocell control may be utilized to close one of the switches 22*a* to *d* momentarily in order to automatically operate an associated receiver when light intensity has attained a predetermined level as determined by the photocell setting. It is also evident that other types of automatic control may be utilized with this apparatus.

The receiver circuit which is actuated by the transmitter described above is shown in FIGURE 2 and is provided with a conventional plug 40 for engagement with a standard AC outlet as in the case of the plug 12. The plug is connected to conductors 41 and 42 which supply energy to the receiving apparatus and to the load and at the same time receive the control signals from the transmitter. DC voltage for operating the receiver is provided by a bridge rectifier 43 having one input terminal 44 connected to the conductor 42 and the other input terminal 45 connected through a resistor 46 to the conductor 41. A condensed 47 is connected between the terminal 45 of the rectifier 43 and the lead 42 to prevent spurious signals including the radio frequency control signals from entering the rectified DC supply. A full wave rectified voltage appears across the bridge terminals 48 and 49, the former being connected to a conductor 50. The output rectifier terminal 49 is fed through a half wave rectifier 51 to the lead 52. A filter condenser 53 is connected between the leads 50 and 52 to provide a filtered DC voltage of a magnitude required for operation of the control circuit.

The control circuit includes a pair of transistors 54 and 55 connected as a bi-stable multivibrator. In the present embodiment of the invention, the load is energized when the transistor 54 is in a conducting state and the transistor 55 is nonconducting.

More specifically, the collector 56 of transistor 54 is connected through a resistor 57 to the lead 52 while the emitter 58 is connected directly to the conductor 50. The transistor 55 is similarly arranged with the collector 59 being connected through a resistor 60 to the lead 52 and the emitter 61 being connected directly to the lead 50. The base 62 of transistor 54 is connected by means of a lead 63 through a resistor 64 and parallel condenser 65 to the collector 59 of transistor 55. Similarly, the base 66 of transistor 55 is connected through the lead 67 and resistor 68, with condenser 69 in parallel, to the collector 56. With this arrangement, if a pulse of a proper polarity is applied to the base of transistor 54, it will cause the transistor 54 to become conducting and at the same time it will automatically place the transistor 55 in a nonconducting state. Similarly, if a pulse of proper polarity is applied to the base of transistor 55, it will cause it to be placed in a conducting state and at the same time the transistor 54 will be placed in a nonconducting state. The operation of the bi-stable multi-vibrator or flip flop is well-known in the art, and further discussion is not believed necessary.

The control pulses applied to the bases of the transistors 54 and 55 are obtained from the radio frequency signals transmitted over the AC line by the transmitter described in connection with FIGURE 1. These signals are sensed by a pair of resonant circuits in the receiver one of which includes a condenser 70 and primary winding 71 of an RF transformer generally denoted by the numeral 72. The winding 71 and the condenser 70 are connected in series between the leads 41 and 42 and are tuned to resonate at one of a set of two frequencies capable of being produced by the transmitter. The second sensing circuit includes a condenser 73 and a primary winding 74 of the transformer 75. In this case, the condenser 73 and the winding 74 are tuned to resonate at the second of a set of two frequencies produced by the transmitter. For convenience of description, let it be assumed that the first frequency is F1 and the second frequency is F2. The secondary 76 of transformer 72 has one side connected to the lead 50, while the other side is connected through a rectifier 77 and a pair of series resistors 78 and 79 to the base 62 of transistor 54. A bypass condenser 80 is connected between the junction of resistors 78 and 79 and the lead 50. A similar arrangement is provided for transistor 55 and consists of a secondary winding 81 connected at one side to the lead 50 and at the other side through a rectifier 82, series resistors 83 and 84 to the base 66 of transistor 55. A condenser 85 is connected between the junction of resistors 83 and 84 and the lead 50.

With this arrangement, when the transmitter switches 22*a* and 25*a* are closed to generate and transmit a frequency F1, this frequency will be sensed by the receiver and apply a unidirectional pulse to the base 62 of the transistor 54 causing it to conduct. Similarly, if the switches 22*b* and 25*b* of the transmitter are closed, a frequency F2 will be generated and this will produce a unidirectional pulse at the base 66 of the transistor 55, thus causing it to be conductive and at the same time rendering the transistor 54 nonconductive. Tuning of the transmitter and receiver merely involves adjustment of the condensers 23*a* and 23*b* and condensers 70 and 73 of the receiver. It is of course possible to adjust the inductance of the windings 71 and 74 in the receiver instead of adjusting the condensers 70 and 73.

The electronic switching means for controlling the load which is connected to the receptacle 86 includes a unijunction transistor 87 and a semi-conductor switch 88. The switch 88 is of the type that will remain in a conductive state as long as current is flowing through the switch after having been placed in the conductive state by a control signal. When such a switch is utilized on alternating current, the control signal must be applied during each half cycle of the alternating current in order to keep the load, connected to the receptacle 86, energized. Such a device may be in the form of a so-called Triac manufactured by General Electric Corporation.

More specifically, the emitter 89 of the unijunction transistor is connected through an adjustable resistor 90 to the collector 59 of transistor 55. A relatively large condenser 91 also connects the base 89 to the lead 50. The first base 92 of the unijunction transistor is connected through a resistor 93 and lead 94 to the junction between the rectifier 51 and the output terminal 49 of the bridge 43. It will will observed that the voltage thus fed to the base 92 is in the form of a plurality of unidirectional positive pulses with one such pulse occurring during each half cycle of the alternating current and in phase with the alternating current. The second base 95 is connected through the primary 96 of the pulse transformer 97 to the lead 50. The secondary 98 of transformer 97 has one side connected to the lead 42 and the other side connected to the control element 99 of the switch 88. The switch 88 further connects one terminal 100 of the receptacle 86 to the lead 42, while the other terminal 101 of the receptacle 86 is connected directly to the lead 41. Thus, when the switch 88 is closed, energy from the alternating current supply will be fed directly to the receptacle 86.

With the foregoing arrangement and with the transistor 55 in the nonconducting state, a relatively high voltage appears at the collector 59. In the present embodiment of the invention, this voltage is of the order of 11 volts. Assuming that the unijunction transistor is nonconducting, the voltage on the condenser 91 will gradually increase at a rate determined by the magnitude of the resistor 90. When the voltage across the condenser reaches a critical value, the uni-junction transmitter will suddenly become conducting and it produces virtually a short-circuit between the bases 92 and 95. This produces a high current flow through the primary 96 of transformer 97 which in turn applies a pulse to the control 99 of the switch 88. This causes the switch to conduct and apply energy to the load connected to the receptacle 86 until the AC voltage falls to zero or until the current through the load drops or decreases essentially to zero. Since it is usually desirable to continuously energize the load, the pulses applied to the emitter 89 of the unijunction transmitter are arranged to occur during each half cycle of the power supply line voltage and this is accomplished by the selection of the condenser 91 of the resistor 90 to produce the desired time constant.

The utilization of this switching arrangement affords another important advantage, namely, the control of the amount of energy fed to the load connected to the receptacle 86. By utilizing a variable resistor 90, as the resistance is decreased, a charge will be developed on the condenser 91 more rapidly so that the critical value will be reached much sooner during each half cycle. In this way, substantially full power is applied to the load. If the resistor is increased in value, the time required for the condenser to reach a critical value will be increased. As a result, the pulse can be made to occur at some point after the peak of each alternating current half cycle in which case a smaller amount of power will be applied to the load. Thus, as the resistance of resistor 90 is increased, the power applied to the load will be decreased and vice versa. The load will of course become de-energized upon the application of a pulse to the transistor 55 which places it in a conducting state since the transistor in such a state will have its collector 59 at substantially ground potential or the potential of the lead 50 in which case insufficient voltage will be available to trigger the unijunction transistor 87.

It is evident from the foregoing description that the invention affords an improved arrangement of circuit elements that provides for a high degree of stability and versatility and avoids critical circuitry that would create numerous maintenance problems. It is also evident that certain alternate circuit arrangements may be utilized while still retaining the important advantages of the invention. For instance, other forms of oscillators may be used in the transmitter such as Colpitts or Hartley circuits and under certain conditions crystals may be used to stabilize the oscillator frequency. Further many devices may be combined with the transmitter to operate it automatically with changes in physical condition such as ambient light, temperature and the like. Receiver circuitry may also utilize alternate arrangements for feeding the control signals to the transistors 54 and 55 and may also embody other types of electronic or electro-mechanical switching means for controlling the load.

What is claimed is:

1. An electronic system comprising a transmitter including an electronic oscillator operable to generate at least two different frequencies, power supply means for said oscillator energized by a conventional AC power circuit, means on said oscillator and interconnected with said AC power circuit for feeding said generated frequencies into said power circuit, receiving means powered by said AC power circuit, said receiving means including a unidirectional pulsed power supply, a bi-stable flip-flop circuit including at least two transistors energized by the last said power supply, a pair of tuned circuits including electrical isolating means connected to said AC power circuit, each of said tuned circuits being tuned to one of said oscillator frequencies, connections between each of said tuned circuits and one of said transistors whereby the reception of one of said oscillator frequencies by said receiver will cause one transistor to conduct and the other transistor to become nonconductive and reception of the other oscillator frequency will cause the other transistor to conduct and said one transistor to become nonconductive and switching means actuated by said flip-flop circuit, said switching means including a pulse generator having a unijunction transistor, means including a diode connecting said AC power circuit to one base of said unijunction transistor for feeding unidirectional pulses thereto, a pulse transformer having a primary winding connected at one side to the other base of said unijunction transistor and at the other side to said unidirectional pulsed power supply, a resistor connecting the emitter of said unijunction transistor to one of the transistors of said flip-flop circuit, a condenser connected between said emitter and the other side of said primary winding whereby the application of energy pulses to said emitter and to said one base produces corresponding pulses in said primary winding, a secondary winding on said pulse transformer, a semiconductor switch adapted to be connected in series with a load and a source of power, said switch including a control element thereon and connections between said control element and said secondary winding to apply periodic pulses to said switch to energize said load.

References Cited

UNITED STATES PATENTS

| | | | |
|---|---|---|---|
| 2,344,618 | 3/1944 | Koch | 325—466 |
| 3,104,373 | 9/1963 | Saliki | 340—171 |
| 3,192,484 | 6/1965 | Carroll | 307—289 |
| 3,283,316 | 11/1966 | Beardmore et al. | 340—310 |
| 3,348,131 | 10/1967 | Banks | 321—45 |
| 3,357,009 | 12/1967 | Rusnak et al. | 340—171 |

OTHER REFERENCES

Howell, Triac Control for AC Power, May 1964, GE App. Note.

JOHN W. CALDWELL, *Primary Examiner.*

A. J. KASPER, *Assistant Examiner.*

U.S. Cl. X.R.

307—252, 289, 295, 305; 323—22; 343—225